US012811662B2

(12) United States Patent
Yuan et al.

(10) Patent No.: US 12,811,662 B2
(45) Date of Patent: Nov. 24, 2026

(54) TECHNIQUES FOR DETERMINING A BEAM FAILURE DETECTION REFERENCE SIGNAL SET AND RESETTING A BEAM AFTER A BEAM FAILURE RECOVERY

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 18/690,615

(22) PCT Filed: Nov. 5, 2021

(86) PCT No.: PCT/CN2021/128861

§ 371 (c)(1),
(2) Date: Mar. 8, 2024

(87) PCT Pub. No.: WO2023/077396

PCT Pub. Date: May 11, 2023

(65) Prior Publication Data

US 2024/0380472 A1 Nov. 14, 2024

(51) Int. Cl.
*H04B 7/06* (2006.01)
*H04L 5/00* (2006.01)

(52) U.S. Cl.
CPC ..... *H04B 7/06964* (2023.05); *H04B 7/06968* (2023.05); *H04L 5/0048* (2013.01)

(58) Field of Classification Search
CPC ............ H04B 7/06964; H04B 7/06968; H04L 5/0048
See application file for complete search history.

(56) References Cited

U.S. PATENT DOCUMENTS

2019/0190582 A1 6/2019 Guo et al.
2021/0092632 A1 3/2021 Liou et al.
(Continued)

FOREIGN PATENT DOCUMENTS

CN 111937462 A 11/2020
CN 112740603 A 4/2021
(Continued)

OTHER PUBLICATIONS

Asustek: "Discussion on SCell BFR regarding RS change", 3GPP Draft; 3GPP TSG-RAN WG2 Meeting #113 bis electronic, R2-2103447, 3rd Generation Partnership Project, Mobile Competence Centre, 650, Route Des Lucioles, F-06921, Sophia-Antipolis Cedex, France, vol. RAN WG2, No. electronic; Apr. 12, 2021-Apr. 20, 2021, Apr. 1, 2021, 4 Pages, XP051992077, section 2.
(Continued)

*Primary Examiner* — Benjamin H Elliott, IV
*Assistant Examiner* — Tracy Lauren Raimondo
(74) *Attorney, Agent, or Firm* — Harrity & Harrity, LLP

(57) ABSTRACT

Various aspects of the present disclosure generally relate to wireless communication. In some aspects, a user equipment (UE) may determine a beam failure detection reference signal (BFD-RS) set based at least in part on active transmission configuration indication (TCI) states for downlink channel receptions in control resource sets (CORESETs), wherein the CORESETs are configured with a CORESET pool index value that exceeds a threshold value. The UE may receive, from a base station, a BFD-RS based at least in part on the BFD-RS set. Numerous other aspects are described.

30 Claims, 7 Drawing Sheets

(56) References Cited

U.S. PATENT DOCUMENTS

| | | | | |
|---|---|---|---|---|
| 2022/0085862 | A1* | 3/2022 | Kung | H04B 7/024 |
| 2022/0225369 | A1* | 7/2022 | Park | H04W 72/0453 |
| 2023/0006727 | A1 | 1/2023 | Jang et al. | |
| 2023/0106244 | A1* | 4/2023 | Yu | H04L 5/0048 370/329 |
| 2023/0163914 | A1* | 5/2023 | Koskela | H04B 7/06964 370/242 |
| 2024/0049010 | A1* | 2/2024 | Wang | H04W 24/04 |
| 2024/0080147 | A1 | 3/2024 | Li | |
| 2024/0214142 | A1* | 6/2024 | Muruganathan | H04B 7/088 |
| 2024/0306015 | A1* | 9/2024 | Matsumura | H04W 24/04 |

FOREIGN PATENT DOCUMENTS

| | | | |
|---|---|---|---|
| CN | 112840695 | A | 5/2021 |
| JP | 2024539041 | A | 10/2024 |
| WO | WO-2020059140 | A1 | 3/2020 |
| WO | 2021027185 | A1 | 2/2021 |
| WO | 2021107575 | A1 | 6/2021 |
| WO | 2021161475 | A1 | 8/2021 |
| WO | 2021175237 | A1 | 9/2021 |
| WO | 2021207562 | A1 | 10/2021 |
| WO | 2023077396 | | 5/2023 |

OTHER PUBLICATIONS

LG Electronics: "Enhancements on HST-SFN Deployment", 3GPP TSG RAN WG1 #106-e, R1-2107818, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, 8 Pages, XP052038689, sections 1, 2.2.

Mediatek Inc: "Enhancement on Beam Management for Multi-TRP", 3GPP Draft; 3GPP TSG RAN WG1 #103-e, R1-2008957, 3rd Generation Partnership Project, Mobile Competence Centre, 650, Route Des Lucioles, F-06921, Sophia-Antipolis Cedex, France, vol. RAN WG1, No. e-Meeting; Oct. 26, 2020-Nov. 13, 2020, Oct. 24, 2020, 9 Pages, XP051946745, section 2.2.

Moderator (Apple Inc): "Summary of [104bis-e-NR-eMIMO-01] Email Discussion", 3GPP Draft; 3GPP TSG-RAN WG1 Meeting #104b-e, R1-2104144, 3rd Generation Partnership Project, Mobile Competence Centre, 650, Route Des Lucioles, F-06921, Sophia-Antipolis Cedex, France, vol. RAN WG1, No. e-Meeting; Apr. 12, 2021-Apr. 20, 2021, Apr. 27, 2021, 6 Pages, XP051998142, sections 1, 3.

Moderator (Oppo): "Summary of [105-e-NR-eMIMO-04] Email Discussion", 3GPP Draft; 3GPP TSG RAN WG1 #105-e, R1-2106323, 3rd Generation Partnership Project, Mobile Competence Centre, 650, Route Des Lucioles, F-06921, Sophia-Antipolis Cedex, France, vol. RAN WG1, No. e-Meeting; May 10, 2021-May 27, 2021, May 27, 2021, 14 Pages, XP052015833, sections 2.1.1, 2.1.2.

Supplementary European Search Report—EP21962913—Search Authority—The Hague—Dec. 10, 2025.

Supplementary Partial European Search Report—EP21962913—Search Authority—The Hague—Nov. 4, 2025.

Intel Corporation: "Remaining Issues on Beam Failure Recovery", R1-1804715, 3GPP TSG RAN WG1 Meeting #92bis, Sanya, China, Apr. 16-20, 2018, Apr. 6, 2018 (Apr. 6, 2018), pp. 1-7, part 2.

International Search Report and Written Opinion—PCT/CN2021/128861—ISA/EPO—May 12, 2022.

Nokia, et al., "Enhancements on Beam Management for Multi-TRP/Panel Transmission", 3GPP TSG RAN WG1 #106bis-e, R1-2109873, e-Meeting, Oct. 11-19, 2021, Oct. 1, 2021, 10 Pages.

Qualcomm Incorporated: "Enhancements on beam management for multi-TRP", 3GPP TSG RAN WG1 Meeting #106-bis-e, R1-2110168, Oct. 11-19, 2021, 10 Pages.

* cited by examiner

TECHNIQUES FOR DETERMINING A BEAM FAILURE DETECTION REFERENCE SIGNAL SET AND RESETTING A BEAM AFTER A BEAM FAILURE RECOVERY

CROSS-REFERENCE TO RELATED APPLICATION

This Patent Application is a 371 national stage of PCT Application No. PCT/CN2021/128861 filed on Nov. 5, 2021, entitled "TECHNIQUES FOR DETERMINING A BEAM FAILURE DETECTION REFERENCE SIGNAL SET AND RESETTING A BEAM AFTER A BEAM FAILURE RECOVERY," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for determining a beam failure detection reference signal (BFD-RS) set and resetting a beam after a beam failure recovery (BFR).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, a method of wireless communication performed by a user equipment (UE) includes determining a beam failure detection reference signal (BFD-RS) set based at least in part on active transmission configuration indication (TCI) states for downlink channel receptions in control resource sets (CORESETs), wherein the CORESETs are configured with a CORESET pool index value that exceeds a threshold value; and receiving, from a base station, a BFD-RS based at least in part on the BFD-RS set.

In some implementations, a method of wireless communication performed by a UE includes transmitting, to a base station associated with multiple transmit-receive points (TRPs), a beam failure recovery (BFR) report based at least in part on a detection of a beam failure event for a TRP; receiving, from the base station, a response based at least in part on the BFR report; and resetting, based at least in part on a receipt of the response, a set of channels for the TRP associated with the beam failure event.

In some implementations, an apparatus for wireless communication at a UE includes a memory and one or more processors, coupled to the memory, configured to: determine a BFD-RS set based at least in part on active TCI states for downlink channel receptions in CORESETs, wherein the CORESETs are configured with a CORESET pool index value that exceeds a threshold value; and receive, from a base station, a BFD-RS based at least in part on the BFD-RS set.

In some implementations, an apparatus for wireless communication at a UE includes a memory and one or more processors, coupled to the memory, configured to: transmit, to a base station associated with multiple TRPs, a BFR report based at least in part on a detection of a beam failure event for a TRP; receive, from the base station, a response based at least in part on the BFR report; and reset, based at least in part on a receipt of the response, a set of channels for the TRP associated with the beam failure event.

In some implementations, a non-transitory computer-readable medium storing a set of instructions for wireless communication includes one or more instructions that, when executed by one or more processors of a UE, cause the UE to: determine a BFD-RS set based at least in part on active TCI states for downlink channel receptions in CORESETs, wherein the CORESETs are configured with a CORESET pool index value that exceeds a threshold value; and receive, from a base station, a BFD-RS based at least in part on the BFD-RS set.

In some implementations, a non-transitory computer-readable medium storing a set of instructions for wireless communication includes one or more instructions that, when executed by one or more processors of a UE, cause the UE to: transmit, to a base station associated with multiple TRPs, a BFR report based at least in part on a detection of a beam failure event for a TRP; receive, from the base station, a response based at least in part on the BFR report; and reset, based at least in part on a receipt of the response, a set of channels for the TRP associated with the beam failure event.

In some implementations, an apparatus for wireless communication includes means for determining a BFD-RS set based at least in part on active TCI states for downlink channel receptions in CORESETs, wherein the CORESETs are configured with a CORESET pool index value that exceeds a threshold value; and means for receiving, from a base station, a BFD-RS based at least in part on the BFD-RS set.

In some implementations, an apparatus for wireless communication includes means for transmitting, to a base station associated with multiple TRPs, a BFR report based at least in part on a detection of a beam failure event for a TRP; means for receiving, from the base station, a response based at least in part on the BFR report; and means for resetting, based at least in part on a receipt of the response, a set of channels for the TRP associated with the beam failure event.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
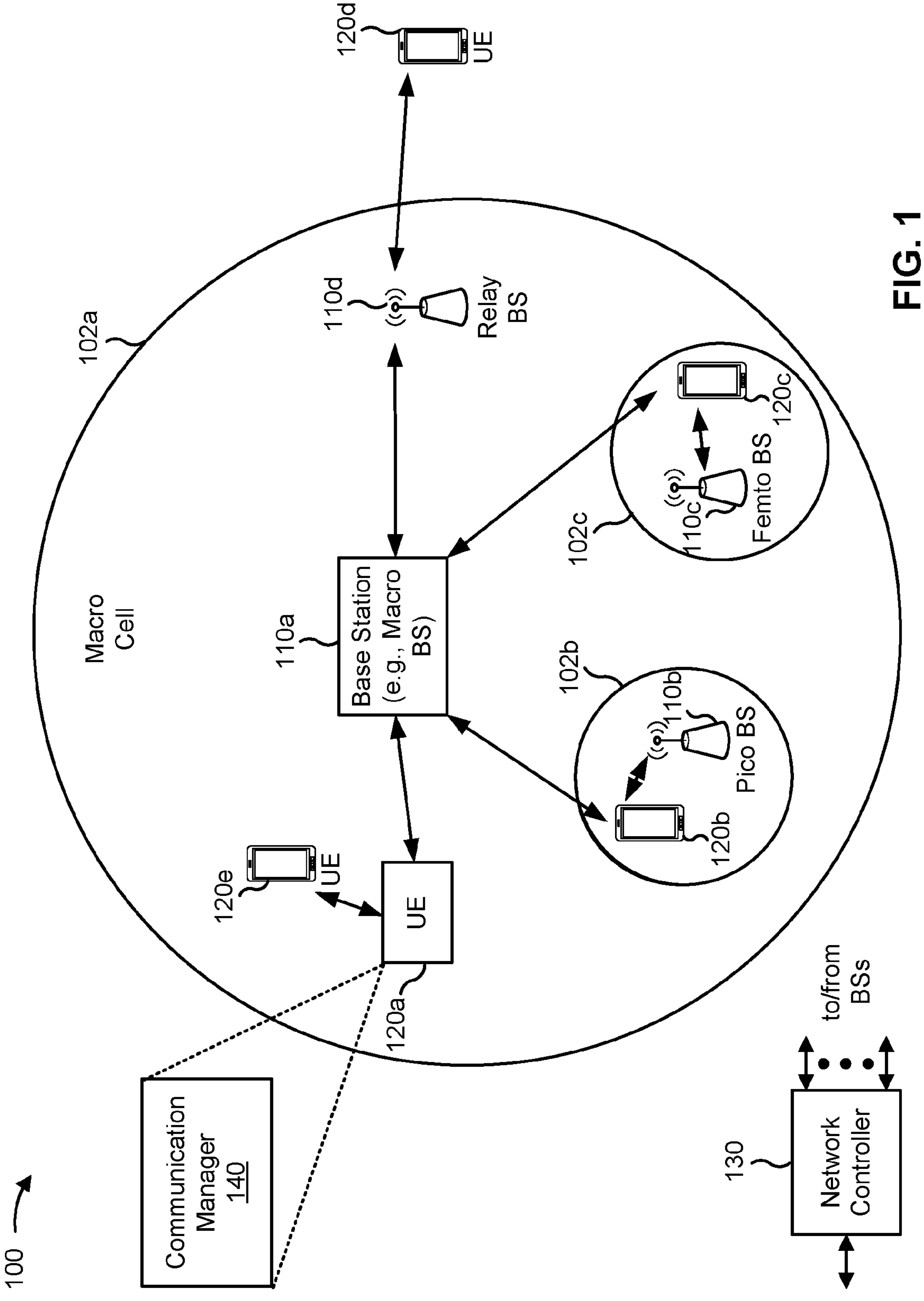
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may determine a beam failure detection reference signal (BFD-RS) set based at least in part on active transmission configuration indication (TCI) states for downlink channel receptions in control resource sets (CORESETs), wherein the CORESETs are configured with a CORESET pool index value that exceeds a threshold value; and receive, from a base station, a BFD-RS based at least in part on the BFD-RS set. Additionally, or alternatively, the communication manager 140 may perform one or more other operations described herein.

In some aspects, a UE (e.g., UE 120) may include a communication manager 140. As described in more detail elsewhere herein, the communication manager 140 may transmit, to a base station associated with multiple TRPs, a beam failure recovery (BFR) report based at least in part on a detection of a beam failure event for a TRP; receive, from the base station, a response based at least in part on the BFR report; and reset, based at least in part on a receipt of the response, a set of channels for the TRP associated with the beam failure event. Additionally, or alternatively, the communication manager 140 may perform one or more other operations described herein.

As indicated above, FIG. 1 is provided as an example. Other examples may differ from what is described with regard to FIG. 1.

Figure 2:
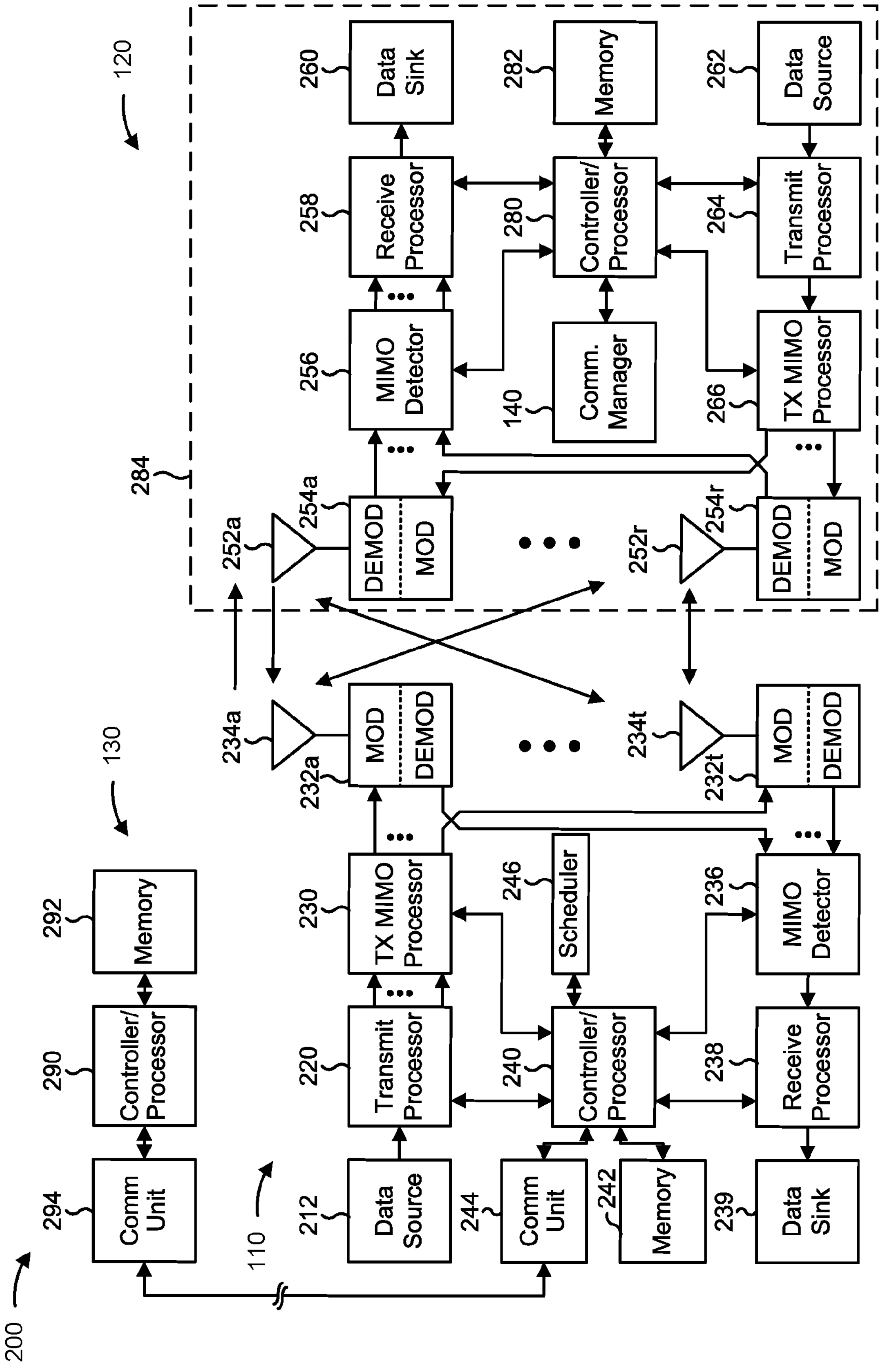
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-7).

The controller/processor 240 of the base station 110, the controller/processor 280 of the UE 120, and/or any other component(s) of FIG. 2 may perform one or more techniques associated with determining a BFD-RS set and resetting a beam after a beam failure recovery, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, a UE (e.g., UE 120) includes means for determining a BFD-RS set based at least in part on active TCI states for downlink channel receptions in CORESETs, wherein the CORESETs are configured with a CORESET pool index value that exceeds a threshold value; and/or means for receiving, from a base station, a BFD-RS based at least in part on the BFD-RS set. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE (e.g., UE 120) includes means for transmitting, to a base station associated with multiple TRPs, a BFR report based at least in part on a detection of a beam failure event for a TRP; means for receiving, from the base station, a response based at least in part on the BFR report; and/or means for resetting, based at least in part on a receipt of the response, a set of channels for the TRP associated with the beam failure event. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In a multi-TRP BFR, two BFD-RS sets may be supported per bandwidth part (BWP), and with up to N resources per BFD-RS set. A value of N may be predefined and/or based at least in part on a UE capability. In other words, the value of N may correspond to a maximum number of BFD-RS resources per BFD-RS set. In some cases, N may be equal to one. A number of BFD-RSs across a plurality of BFD-RSs per downlink BWP may be associated with a fixed maximum value or may be based at least in part on the UE capability. Further, a per-TRP BFR may be supported in NR.

In a multi-downlink control information (multi-DCI) scenario, a BFD-RS set on a special cell (SpCell) may be associated with a physical uplink control channel (PUCCH) scheduling request (SR) (PUCCH-SR) resource or an SR configuration for a per-TRP BFR. A UE capability signaling may indicate whether a UE supports an association between the BFD-RS set on the SpCell and the PUCCH-SR resource or SR configuration for the per-TRP BFR.

In the multi-DCI scenario and for UEs with one activated TCI state per CORESET, a BFD-RS configuration may be supported in which a BFD-RS set k (k=0, 1) may be derived based at least in part on X TCI of CORESETs with a CORESET pool index (CORESETPoolIndex) equal to k. A value of X may be predefined or based at least in part on the UE capability. The X TCI may be based at least in part on a TCI selection rule when a number of CORESETs with the CORESET pool index of k exceeds X. In some cases, the CORESETs may be associated with more than one activated TCI state. The CORESET pool index may be used to identify a TRP identify, and different CORESET pool indexes may be associated with different TRPs.

The UE may be provided, for each BWP of a serving cell, a set $q_0$ of periodic channel state information reference signal (CSI-RS) resource configuration indexes by a failure detection resources (failureDetectionResources) parameter. The UE may be provided a set $q_1$ of periodic CSI-RS resource configuration indexes and/or synchronization signal (SS) or physical broadcast channel (PBCH) block indexes by a candidate beam reference signal list (candidateBeamRSList or candidateBeamRSListExt-r16) parameter or a candidate beam reference signal secondary cell list (candidateBeamRSSCellList-r16) parameter for radio link quality measurements on the BWP of the serving cell. When the UE is not provided the set $q_0$ by the failure detection resources (failure DetectionResources) parameter or a beam failure detection resource list (beamFailureDetectionResourceList) for the BWP of the serving cell, the UE may determine the set $q_0$ to include periodic CSI-RS resource configuration indexes with same values as reference signal (RS) indexes in the reference signal sets indicated by a TCI state for respective CORESETs that the UE uses for monitoring a physical downlink control channel (PDCCH). When two RS indexes are present in the TCI state, the set $q_0$ may include RS indexes with a quasi co-location (QCL) Type D (QCL-TypeD) configuration for corresponding TCI states. The UE may expect the set $q_0$ to include up to two RS indexes.

In past approaches, both an explicit and an implicit BFD-RS determination may be supported. However, the past approaches do not specify, for an implicit BFD-RS determination in a per-TRP BFR, a mechanism for selecting a number of BFD-RSs when the number of CORESETs with the CORESET pool index equal to k exceeds the value of X and when a CORESET is configured with more than one TCI state. Further, in the past approaches, a beam associated with a new beam identification reference signal (NBI-RS) may be applied to reset only a PDCCH/PUCCH beam. Further, in the past approaches, a unified TCI may be used for other channels, such as a physical downlink shared channel (PDSCH) or a physical uplink shared channel (PUSCH). However, the past approaches do not consider channels for a new beam reset after a BFR for a multi-TRP operation.

In various aspects of techniques and apparatuses described herein, a UE may determine a BFD-RS set based at least in part on active TCI states for downlink channel receptions in CORESETs. The CORESETs may be configured with a CORESET pool index value that exceeds a threshold value. The UE may receive, from a base station, a BFD-RS based at least in part on the BFD-RS set, where the base station may be associated with multiple TRPs. As a result, the UE may determine the BFD-RS set with the CORESETs configured with the CORESET pool index value exceeding the threshold value. In some aspects, the UE may transmit, to the base station, a BFR report based at least in part on a detection of a beam failure event for a TRP. The UE may receive, from the base station, a response based at least in part on the BFR report. The UE may reset, based at least in part on a receipt of the response, a set of channels for the TRP associated with the beam failure event. As a result, a beam reset behavior after the BFR may be defined for the UE.

Figure 3:
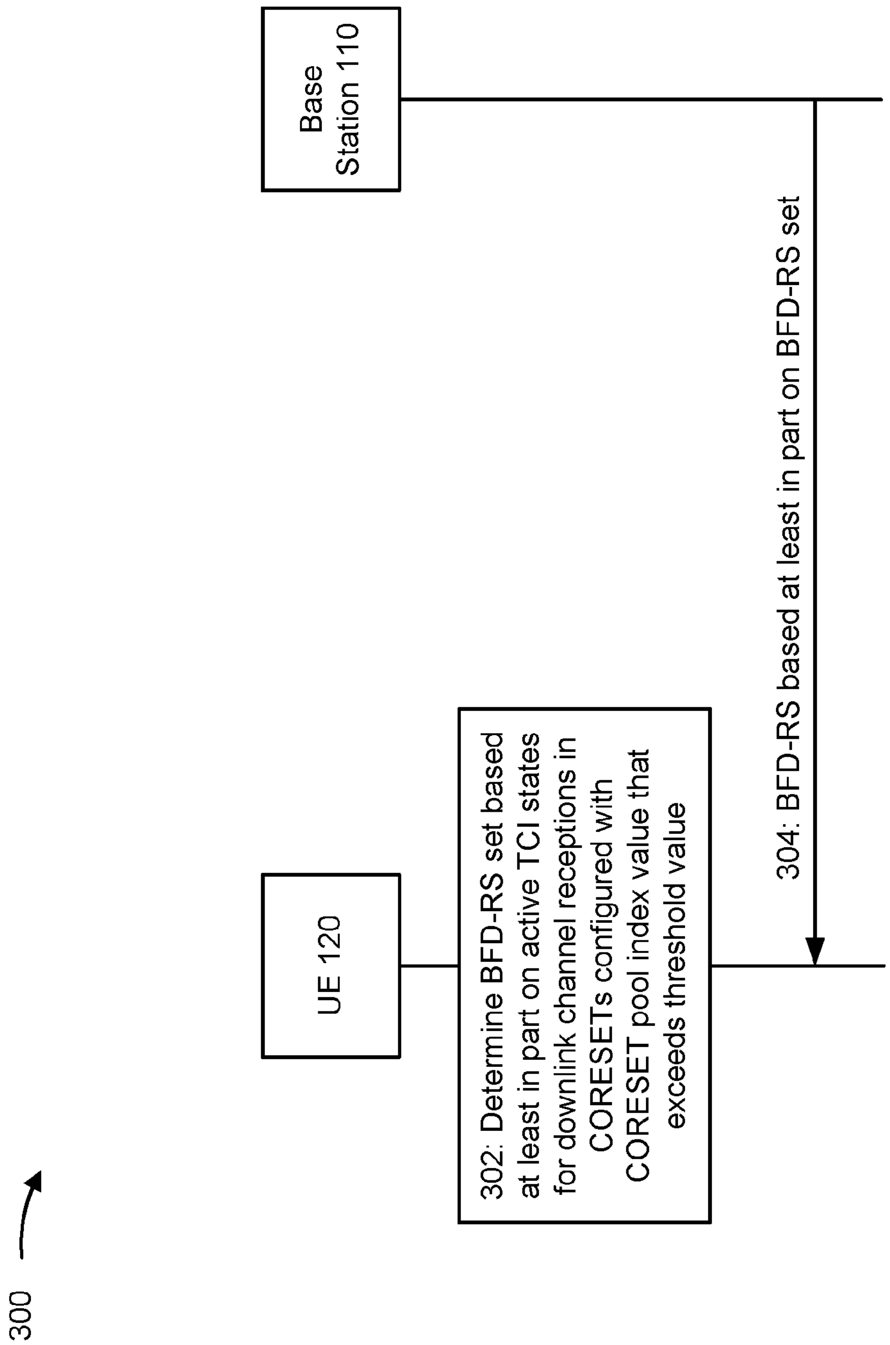
FIG. 3 is a diagram illustrating an example associated with determining a beam failure detection reference signal (BFD-RS) set, in accordance with the present disclosure.

FIG. 3 is a diagram illustrating an example 300 associated with determining a BFD-RS set, in accordance with the present disclosure. As shown in FIG. 3, example 300 includes communication between a UE (e.g., UE 120) and a base station (e.g., base station 110). In some aspects, the UE and the base station may be included in a wireless network, such as wireless network 100.

As shown by reference number 302, the UE may determine a BFD-RS set based at least in part on active TCI states for downlink channel receptions in CORESETs. The CORESETs may be configured with a CORESET pool index value that exceeds a threshold value. The threshold value may be based at least in part on a UE capability. The CORESETs may be associated with search space sets in an order that is based at least in part on a monitoring periodicity. When a CORESET is associated with multiple search space sets, the monitoring periodicity to order the CORESET may be the shortest monitoring periodicity of the search space set among the multiple search space sets associated with the CORESET. In some cases, more than one CORESET in the CORESETs may be associated with search space sets having a same monitoring periodicity, and an ordering of the more than one CORESET may be based at least in part on the CORESET pool index.

In some aspects, the UE may determine the BFD-RS, where the UE may be associated with CORESETs configured with the CORESET pool index equal to k that exceeds a number of X (e.g., by a UE capability or a predetermined value). A CORESET may correspond to a set of time and frequency resources used to carry a downlink channel. The CORESET may be localized to a specific region in a frequency domain, as opposed to being spread across a whole channel bandwidth. In some aspects, when a BFD-RS set k (k=0,1) is not configured to the UE, the UE may determine the BFD-RS set k based at least in part on the active TCI states for the PDCCH receptions in the CORESETs configured with the CORESET pool index equal to k and associated with the search space sets in the order from a shortest monitoring periodicity. When more than one CORESET is associated with search space sets having the same monitoring periodicity, the UE may determine the order of the CORESET based at least in part on the CORESET identification (ID). For example, when more than one CORESET is associated with search space sets having the same monitoring periodicity, the UE may determine the order of the CORESET from a highest CORESET ID, or from a lowest CORESET ID.

In some aspects, at least one CORESET of the CORESETs may be associated with two TCI states. The BFD-RS set may be based at least in part on a QCL RS of the CORESETs configured with the CORESET pool index value. In some aspects, the BFD-RS set may be based at least in part on the QCL RS of the CORESETs configured with the CORESET pool index value with single TCI states. In some aspects, the BFD-RS set may be based at least in part on the QCL RS of the CORESETs configured with the CORESET pool index value with both single TCI states and two TCI states. In some aspects, the BFD-RS set may be based at least in part on the QCL RS of the CORESETs configured with the CORESET pool index value with two TCI states. In some aspects, the BFD-RS set may be based at least in part on the QCL RS of the CORESETs configured with the CORESET pool index value with single TCI states or one QCL RS of the CORESETs configured with the CORESET pool index value with two TCI states. In some aspects, the UE may select one QCL RS for the at least one CORESET associated with the two TCI states based at least in part on a rule. For example, the rule may be a QCL RS of a first TCI state in the two TCI states, a QCL RS of a second TCI state in the two TCI states, a QCL RS of a TCI with a lowest identifier in the two TCI states, a QCL RS of a TCI with a highest identifier in the two TCI states, or a QCL RS with a smallest RS periodicity in the two TCI states.

In some aspects, when at least one CORESET is associated with two TCI states, the UE may select the BFD-RS set k based at least in part on the QCL RS of CORESET(s) configured with the CORESET pool index equal to k with only single TCI states. In some aspects, the UE may select the BFD-RS set k based at least in part on the QCL RS of CORESET(s) configured with the CORESET pool index equal to k with both single and two TCI states. In some aspects, the UE may select the BFD-RS set k based at least in part on only the QCL RS of CORESET(s) configured with the CORESET pool index equal to k with two TCI states. In some aspects, the UE may select the BFD-RS set k based at least in part on the QCL RS of CORESET(s) configured with the CORESET pool index equal to k with only single TCI states, or one QCL RS of CORESET(s) configured with the CORESET pool index equal to k with two TCI states, which may preclude the UE from selecting two QCL RSs from a same CORESET. In some aspects, when selecting one QCL RS for the CORESET with two TCI states, the UE may select a QCL RS of a first or second TCI, a QCL RS of a TCI with a lowest or highest identifier, or a QCL RS with a smallest RS periodicity.

As shown by reference number 304, the UE may receive, from the base station, a BFD-RS based at least in part on the BFD-RS set. The UE may detect a beam failure event based at least in part on the BFD-RS.

As indicated above, FIG. 3 is provided as an example. Other examples may differ from what is described with regard to FIG. 3.

Figure 4:
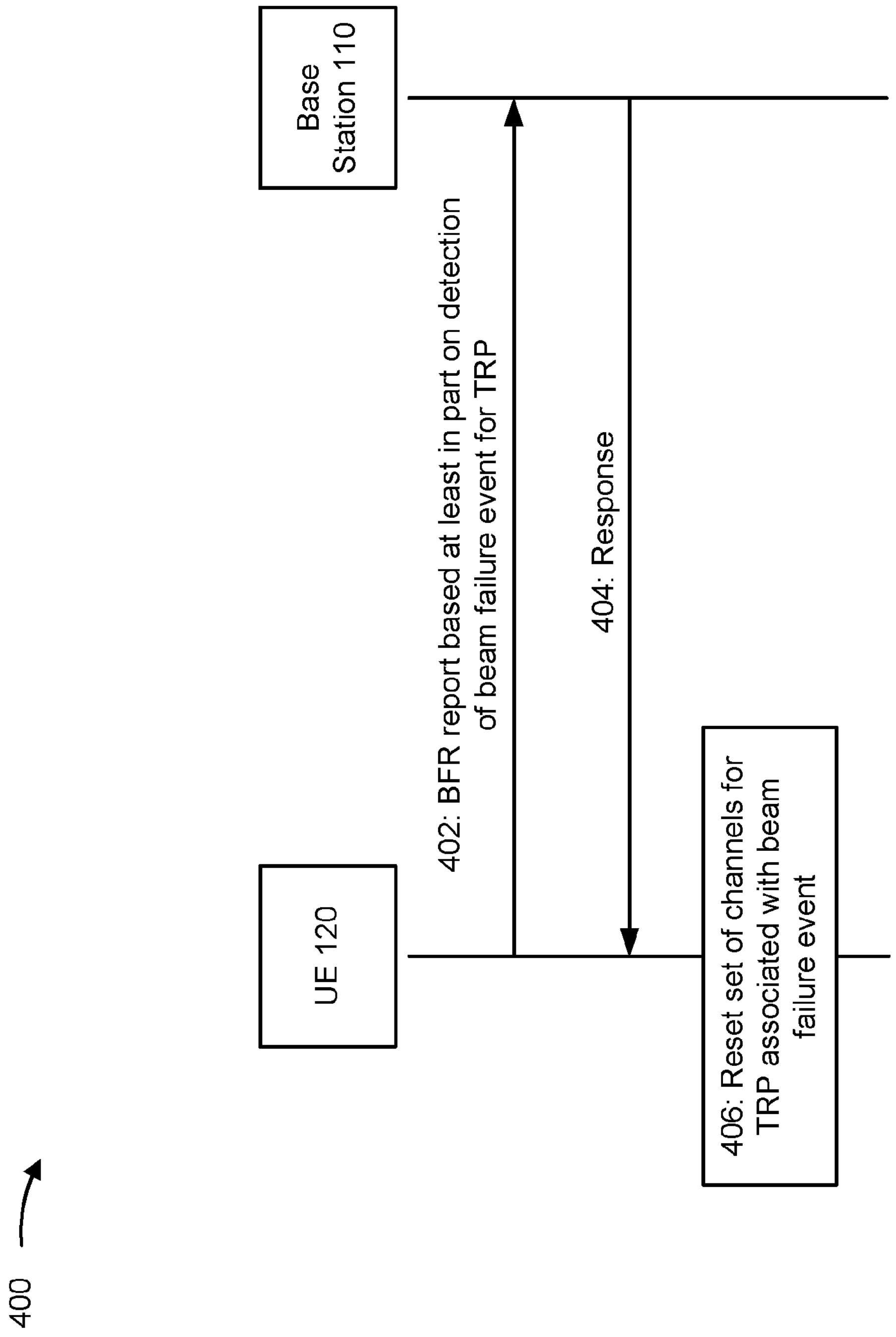
FIG. 4 is a diagram illustrating an example associated with resetting a beam after a beam failure recovery, in accordance with the present disclosure.

FIG. 4 is a diagram illustrating an example 400 associated with resetting a beam after a beam failure recovery, in accordance with the present disclosure. As shown in FIG. 4, example 400 includes communication between a UE (e.g., UE 120) and a base station (e.g., base station 110). In some aspects, the UE and the base station may be included in a wireless network, such as wireless network 100.

As shown by reference number 402, the UE may transmit, to the base station associated with multiple TRPs, a BFR report based at least in part on a detection of a beam failure event for a TRP. In other words, the UE may detect the beam failure event for the TRP, based at least in part on a BFD-RS. The UE may transmit the BFR report to the base station after detecting the beam failure event for the TRP.

As shown by reference number 404, the UE may receive, from the base station, a response based at least in part on the BFR report. The response may acknowledge that the BFR report is received at the base station.

As shown by reference number 406, the UE may reset, based at least in part on a receipt of the response, a set of channels for the TRP associated with the beam failure event, when a NBI-RS has been reported in the BFR report. In some aspects, the set of channels may be reset for the TRP associated with the beam failure event using a beam associated with the reported NBI-RS. The set of channels may include a downlink control channel and/or an uplink control channel. In some aspects, the set of channels may be reset for the TRP associated with the beam failure event based at least in part on a TCI applied to the reported NBI-RS.

In some aspects, a beam reset behavior may be defined for the UE after a BFR. The UE may detect the beam failure event for the TRP. The UE may report a new candidate RS (e.g., NBI-RS) to the base station. The UE may report the new candidate RS in the BFR report. In some aspects, after the UE receives the response from the base station based at least in part on the BFR report, the UE may reset channels of a PDCCH and/or a PUCCH for a failed TRP using the beam associated with the reported NBI-RS.

In some aspects, the TCI applied to receive the NBI-RS at the UE may be a joint TCI, and the TCI associated with the NBI-RS may be applied for the set of channels including downlink channels such as PDCCH and PDSCH channels, and uplink channels such as PUCCH and PUSCH channels. The joint TCI may be applied to a CSI-RS or a sounding reference signal (SRS). In some aspects, the TCI applied to the NBI-RS may be a downlink TCI, and the TCI associated with the NBI-RS may be applied for the set of channels that includes downlink channels such as PDCCH and PDSCH channels. The downlink TCI may be applied to a CSI-RS. In some aspects, the TCI applied to the NBI-RS may be an uplink TCI, and the TCI associated with the NBI-RS may be applied for the set of channels that includes uplink channels such as PUCCH and PUSCH channels. The uplink TCI may be applied to an SRS.

In some aspects, after the UE receives the response from the base station based at least in part on the BFR report, the UE may reset a set of channels for the failed TRP depending on a TCI applied to the NBI-RS. When the TCI applied to the NBI-RS is the joint TCI, the UE may apply the TCI associated with the NBI-RS for a plurality of channels including a PDCCH, a PDSCH, a PUSCH, and a PUCCH to the failed TRP. In some cases, the TCI may be applied to the CSI-RS and/or the SRS. When the TCI applied to the NBI-RS is the downlink TCI, the UE may apply the TCI associated with the NBI-RS for a plurality of channels including a PDCCH and a PDSCH. In some cases, the TCI may be applied to the CSI-RS. When the TCI applied to the NBI-RS is the uplink TCI, the UE may apply the TCI associated with the NBI-RS for a plurality of channels including a PUCCH and a PUSCH. In some cases, the TCI may be applied to the SRS.

As indicated above, FIG. 4 is provided as an example. Other examples may differ from what is described with regard to FIG. 4.

Figure 5:
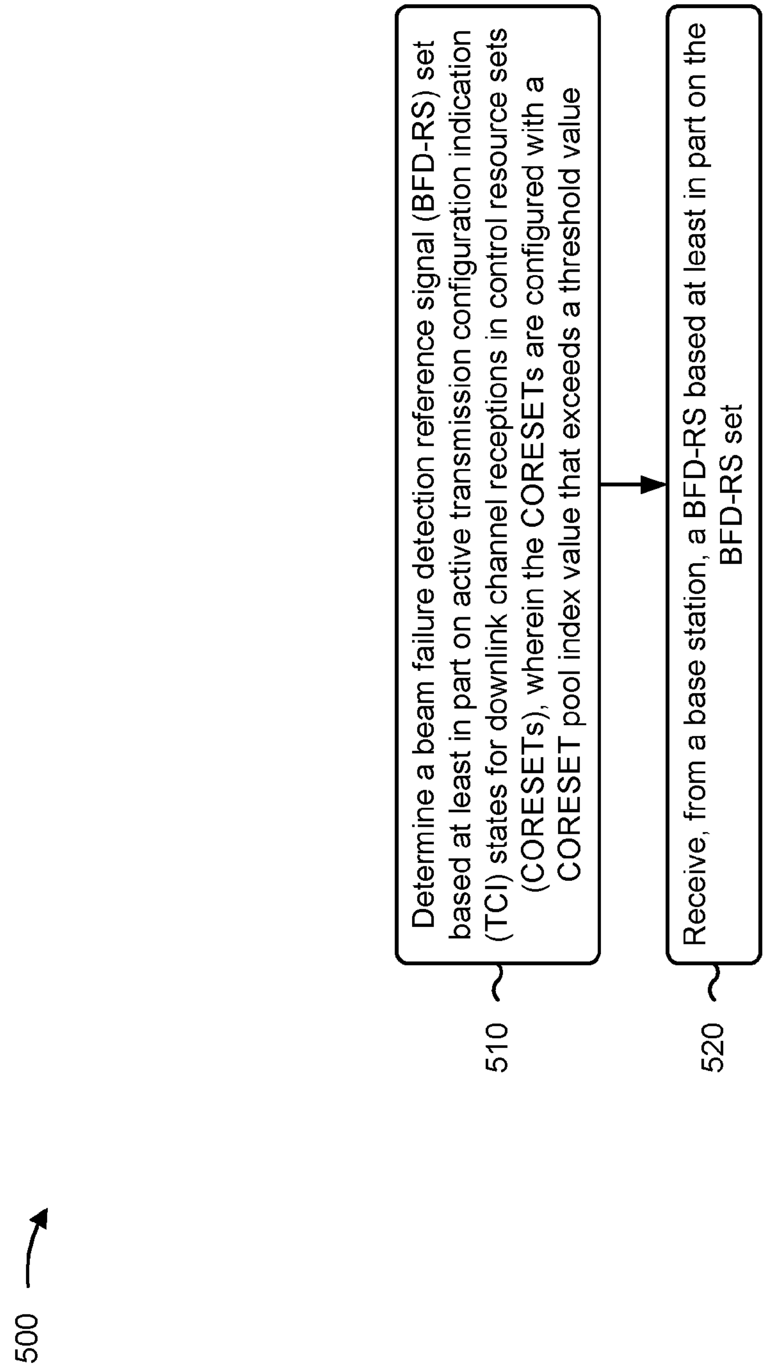
FIG. 5 is a diagram illustrating an example process associated with determining a BFD-RS set, in accordance with the present disclosure.

FIG. 5 is a diagram illustrating an example process 500 performed, for example, by a UE, in accordance with the present disclosure. Example process 500 is an example where the UE (e.g., UE 120) performs operations associated with determining a BFD-RS set and resetting a beam after a BFR.

As shown in FIG. 5, in some aspects, process 500 may include determining a BFD-RS set based at least in part on active TCI states for downlink channel receptions in CORESETs, wherein the CORESETs are configured with a CORESET pool index value that exceeds a threshold value (block 510). For example, the UE (e.g., using communication manager 140 and/or determination component 708, depicted in FIG. 7) may determine a BFD-RS set based at least in part on active TCI states for downlink channel receptions in CORESETs, wherein the CORESETs are configured with a CORESET pool index value that exceeds a threshold value, as described above.

As further shown in FIG. 5, in some aspects, process 500 may include receiving, from a base station, a BFD-RS based at least in part on the BFD-RS set (block 520). For example, the UE (e.g., using communication manager 140 and/or reception component 702, depicted in FIG. 7) may receive, from a base station, a BFD-RS based at least in part on the BFD-RS set, as described above.

Process 500 may include additional aspects, such as any single aspect or any combination of aspects described below and/or in connection with one or more other processes described elsewhere herein.

In a first aspect, the threshold value is based at least in part on a UE capability.

In a second aspect, alone or in combination with the first aspect, the CORESETs are associated with search space sets in an order that is based at least in part on a monitoring periodicity.

In a third aspect, alone or in combination with one or more of the first and second aspects, more than one CORESET in the CORESETs is associated with search space sets having a same monitoring periodicity, and an ordering of the more than one CORESET is based at least in part on the CORESET pool index.

In a fourth aspect, alone or in combination with one or more of the first through third aspects, at least one CORESET of the CORESETs is associated with two TCI states, and the BFD-RS set is based at least in part on a QCL RS of the CORESETs configured with the CORESET pool index value.

In a fifth aspect, alone or in combination with one or more of the first through fourth aspects, the BFD-RS set is based at least in part on the QCL RS of the CORESETs configured with the CORESET pool index value with single TCI states.

In a sixth aspect, alone or in combination with one or more of the first through fifth aspects, the BFD-RS set is based at least in part on the QCL RS of the CORESETs configured with the CORESET pool index value with both single TCI states and two TCI states.

In a seventh aspect, alone or in combination with one or more of the first through sixth aspects, the BFD-RS set is based at least in part on the QCL RS of the CORESETs configured with the CORESET pool index value with two TCI states.

In an eighth aspect, alone or in combination with one or more of the first through seventh aspects, the BFD-RS set is based at least in part on the QCL RS of the CORESETs configured with the CORESET pool index value with single TCI states or one QCL RS of the CORESETs configured with the CORESET pool index value with two TCI states.

In a ninth aspect, alone or in combination with one or more of the first through eighth aspects, process 500 includes selecting one QCL RS for the at least one CORESET associated with the two TCI states based at least in part on a QCL RS of a first TCI state, a QCL RS of a second TCI state, a QCL RS of a TCI with a lowest identifier, a QCL RS of a TCI with a highest identifier, or a QCL RS with a smallest RS periodicity.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
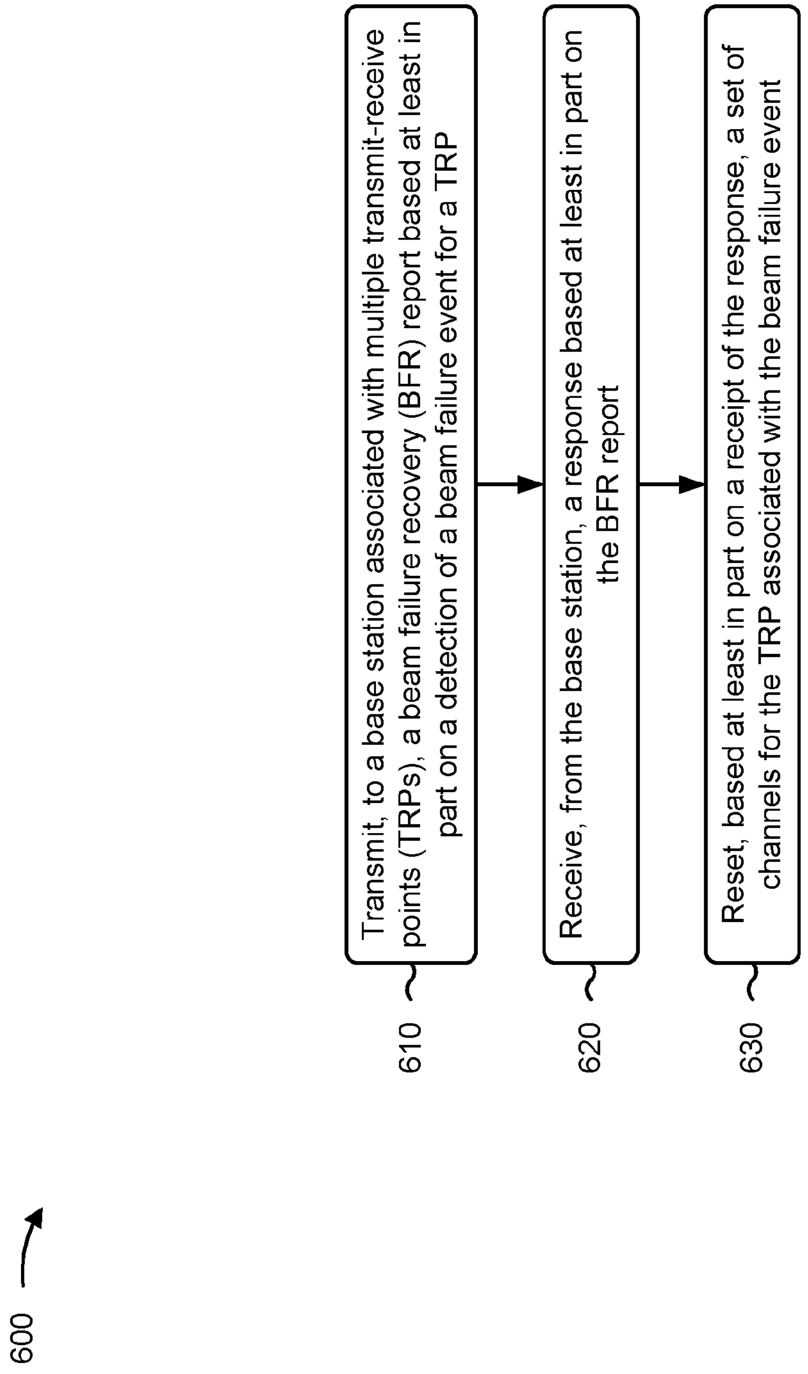
FIG. 6 is a diagram illustrating an example process associated with resetting a beam after a beam failure recovery, in accordance with the present disclosure.

FIG. 6 is a diagram illustrating an example process 600 performed, for example, by a UE, in accordance with the present disclosure. Example process 600 is an example where the UE (e.g., UE 120) performs operations associated with determining a BFD-RS set and resetting a beam after a BFR.

As shown in FIG. 6, in some aspects, process 600 may include transmitting, to a base station associated with multiple TRPs, a BFR report based at least in part on a detection of a beam failure event for a TRP (block 610). For example, the UE (e.g., using communication manager 140 and/or transmission component 704, depicted in FIG. 7) may transmit, to a base station associated with multiple TRPs, a BFR report based at least in part on a detection of a beam failure event for a TRP, as described above.

As further shown in FIG. 6, in some aspects, process 600 may include receiving, from the base station, a response based at least in part on the BFR report (block 620). For example, the UE (e.g., using communication manager 140 and/or reception component 702, depicted in FIG. 7) may receive, from the base station, a response based at least in part on the BFR report, as described above.

As further shown in FIG. 6, in some aspects, process 600 may include resetting, based at least in part on a receipt of the response, a set of channels for the TRP associated with the beam failure event (block 630). For example, the UE (e.g., using communication manager 140 and/or reset component 710, depicted in FIG. 7) may reset, based at least in part on a receipt of the response, a set of channels for the TRP associated with the beam failure event, as described above.

Process 600 may include additional aspects, such as any single aspect or any combination of aspects described below and/or in connection with one or more other processes described elsewhere herein.

In a first aspect, the set of channels is reset for the TRP associated with the beam failure event using a beam associated with a reported NBI-RS.

In a second aspect, alone or in combination with the first aspect, the set of channels includes one or more of a downlink control channel or an uplink control channel.

In a third aspect, alone or in combination with one or more of the first and second aspects, the set of channels is reset for the TRP associated with the beam failure event based at least in part on a TCI applied to a reported NBI-RS.

In a fourth aspect, alone or in combination with one or more of the first through third aspects, the TCI applied to the NBI-RS is a joint TCI, and the TCI associated with the NBI-RS is applied for the set of channels including downlink channels and uplink channels.

In a fifth aspect, alone or in combination with one or more of the first through fourth aspects, the joint TCI is applied to one or more of a CSI-RS or an SRS.

In a sixth aspect, alone or in combination with one or more of the first through fifth aspects, the TCI applied to the NBI-RS is a downlink TCI, and the TCI associated with the NBI-RS is applied for the set of channels that includes downlink channels.

In a seventh aspect, alone or in combination with one or more of the first through sixth aspects, the downlink TCI is applied to a CSI-RS.

In an eighth aspect, alone or in combination with one or more of the first through seventh aspects, the TCI applied to the NBI-RS is an uplink TCI, and the TCI associated with the NBI-RS is applied for the set of channels that includes uplink channels.

In a ninth aspect, alone or in combination with one or more of the first through eighth aspects, the uplink TCI is applied to an SRS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
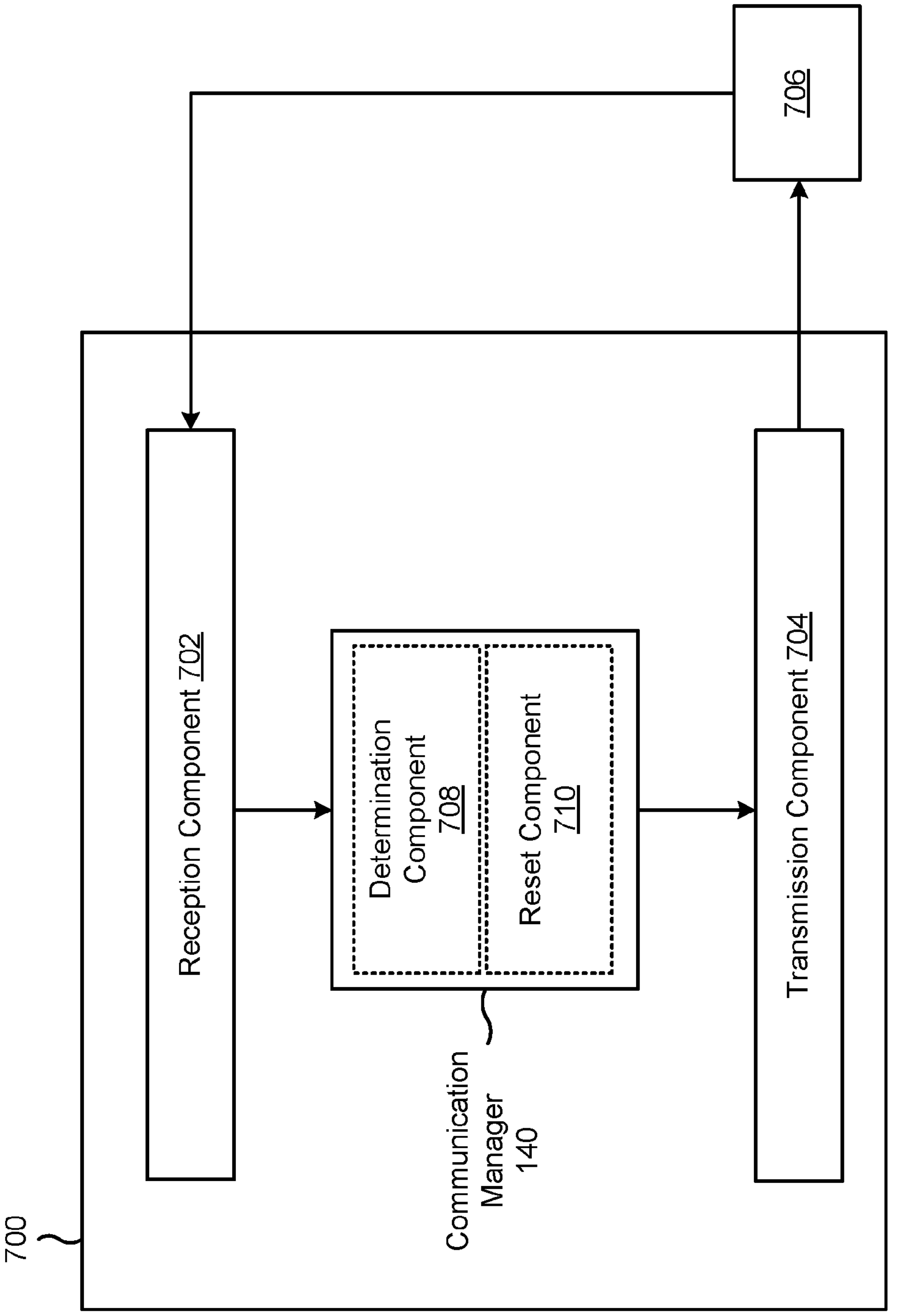
FIG. 7 is a diagram of an example apparatus for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a determination component 708, or a reset component 710, among other examples.

In some aspects, the apparatus 700 may be configured to perform one or more operations described herein in connection with FIGS. 3-4. Additionally, or alternatively, the apparatus 700 may be configured to perform one or more processes described herein, such as process 500 of FIG. 5, process 600 of FIG. 6, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The determination component 708 may determine a BFD-RS set based at least in part on active TCI states for downlink channel receptions in CORESETs, wherein the CORESETs are configured with a CORESET pool index value that exceeds a threshold value. The reception component 702 may receive, from a base station, a BFD-RS based at least in part on the BFD-RS set.

The transmission component 704 may transmit, to a base station associated with multiple TRPs, a BFR report based at least in part on a detection of a beam failure event for a TRP. The reception component 702 may receive, from the base station, a response based at least in part on the BFR report. The reset component 710 may reset, based at least in part on a receipt of the response, a set of channels for the TRP associated with the beam failure event.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: determining a beam failure detection reference signal (BFD-RS) set based at least in part on active transmission configuration indication (TCI) states for downlink channel receptions in control resource sets (CORESETs), wherein the CORESETs are configured with a CORESET pool index value that exceeds a threshold value; and receiving, from a base station, a BFD-RS based at least in part on the BFD-RS set.

Aspect 2: The method of Aspect 1, wherein the threshold value is based at least in part on a UE capability.

Aspect 3: The method of any of Aspects 1 through 2, wherein the CORESETs are associated with search space sets in an order that is based at least in part on a monitoring periodicity.

Aspect 4: The method of any of Aspects 1 through 3, wherein more than one CORESET in the CORESETs is associated with search space sets having a same monitoring periodicity, and wherein an ordering of the more than one CORESET is based at least in part on the CORESET pool index.

Aspect 5: The method of any of Aspects 1 through 4, wherein at least one CORESET of the CORESETs is associated with two TCI states, and wherein the BFD-RS set is based at least in part on a quasi co-location (QCL) reference signal (RS) of the CORESETs configured with the CORESET pool index value.

Aspect 6: The method of Aspect 5, wherein the BFD-RS set is based at least in part on the QCL RS of the CORESETs configured with the CORESET pool index value with single TCI states.

Aspect 7: The method of Aspect 5, wherein the BFD-RS set is based at least in part on the QCL RS of the CORESETs configured with the CORESET pool index value with both single TCI states and two TCI states.

Aspect 8: The method of Aspect 5, wherein the BFD-RS set is based at least in part on the QCL RS of the CORESETs configured with the CORESET pool index value with two TCI states.

Aspect 9: The method of Aspect 5, wherein the BFD-RS set is based at least in part on the QCL RS of the CORESETs configured with the CORESET pool index value with single TCI states or one QCL RS of the CORESETs configured with the CORESET pool index value with two TCI states.

Aspect 10: The method of Aspect 5, further comprising: selecting one QCL RS for the at least one CORESET associated with the two TCI states based at least in part on: a QCL RS of a first TCI state, a QCL RS of a second TCI state, a QCL RS of a TCI with a lowest identifier, a QCL RS of a TCI with a highest identifier, or a QCL RS with a smallest RS periodicity.

Aspect 11: A method of wireless communication performed by a user equipment (UE), comprising: transmitting, to a base station associated with multiple transmit-receive points (TRPs), a beam failure recovery (BFR) report based at least in part on a detection of a beam failure event for a TRP; receiving, from the base station, a response based at least in part on the BFR report; and resetting, based at least in part on a receipt of the response, a set of channels for the TRP associated with the beam failure event.

Aspect 12: The method of Aspect 11, wherein the set of channels is reset for the TRP associated with the beam failure event using a beam associated with a reported new beam identification reference signal.

Aspect 13: The method of any of Aspects 11 through 12, wherein the set of channels includes one or more of a downlink control channel or an uplink control channel.

Aspect 14: The method of any of Aspects 11 through 13, wherein the set of channels is reset for the TRP associated with the beam failure event based at least in part on a transmission configuration indicator (TCI) applied to a reported new beam identification reference signal (NBI-RS).

Aspect 15: The method of Aspect 14, wherein the TCI applied to the NBI-RS is a joint TCI, and wherein the TCI associated with the NBI-RS is applied for the set of channels including downlink channels and uplink channels.

Aspect 16: The method of Aspect 15, wherein the joint TCI is applied to one or more of a channel state information reference signal or a sounding reference signal.

Aspect 17: The method of Aspect 14, wherein the TCI applied to the NBI-RS is a downlink TCI, and wherein the TCI associated with the NBI-RS is applied for the set of channels that includes downlink channels.

Aspect 18: The method of Aspect 17, wherein the downlink TCI is applied to a channel state information reference signal.

Aspect 19: The method of Aspect 14, wherein the TCI applied to the NBI-RS is an uplink TCI, and wherein the TCI associated with the NBI-RS is applied for the set of channels that includes uplink channels.

Aspect 20: The method of Aspect 19, wherein the uplink TCI is applied to a sounding reference signal.

Aspect 21: An apparatus for wireless communication at a device, comprising a processor; memory coupled with the processor; and instructions stored in the memory and executable by the processor to cause the apparatus to perform the method of one or more of Aspects 1-10.

Aspect 22: A device for wireless communication, comprising a memory and one or more processors coupled to the memory, the one or more processors configured to perform the method of one or more of Aspects 1-10.

Aspect 23: An apparatus for wireless communication, comprising at least one means for performing the method of one or more of Aspects 1-10.

Aspect 24: A non-transitory computer-readable medium storing code for wireless communication, the code comprising instructions executable by a processor to perform the method of one or more of Aspects 1-10.

Aspect 25: A non-transitory computer-readable medium storing a set of instructions for wireless communication, the set of instructions comprising one or more instructions that, when executed by one or more processors of a device, cause the device to perform the method of one or more of Aspects 1-10.

Aspect 26: An apparatus for wireless communication at a device, comprising a processor; memory coupled with the processor; and instructions stored in the memory and executable by the processor to cause the apparatus to perform the method of one or more of Aspects 11-20.

Aspect 27: A device for wireless communication, comprising a memory and one or more processors coupled to the memory, the one or more processors configured to perform the method of one or more of Aspects 11-20.

Aspect 28: An apparatus for wireless communication, comprising at least one means for performing the method of one or more of Aspects 11-20.

Aspect 29: A non-transitory computer-readable medium storing code for wireless communication, the code comprising instructions executable by a processor to perform the method of one or more of Aspects 11-20.

Aspect 30: A non-transitory computer-readable medium storing a set of instructions for wireless communication, the set of instructions comprising one or more instructions that, when executed by one or more processors of a device, cause the device to perform the method of one or more of Aspects 11-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

determining a beam failure detection reference signal (BFD-RS) set based at least in part on active transmission configuration indication (TCI) states for downlink channel receptions in control resource sets (CORESETs), wherein the CORESETs are configured with a CORESET pool index value that exceeds a threshold value, wherein the CORESET pool index value is either 0 or 1, wherein determination of a BFD-RS set is based at least in part on a threshold number of TCI states of CORESETs with the CORESET pool index value; and receiving, from a base station, a BFD-RS based at least in part on the BFD-RS set.

2. The method of claim 1, wherein the threshold value is based at least in part on a UE capability.

3. The method of claim 1, wherein the CORESETs are associated with search space sets in an order that is based at least in part on a monitoring periodicity.

4. The method of claim 1, wherein more than one CORESET in the CORESETs is associated with search space sets having a same monitoring periodicity, and wherein an ordering of the more than one CORESET is based at least in part on the CORESET pool index.

5. The method of claim 1, wherein at least one CORESET of the CORESETs is associated with two TCI states, and wherein the BFD-RS set is based at least in part on a quasi co-location (QCL) reference signal (RS) of the CORESETs configured with the CORESET pool index value.

6. The method of claim 5, wherein the BFD-RS set is based at least in part on the QCL RS of the CORESETs configured with the CORESET pool index value with single TCI states.

7. The method of claim 5, wherein the BFD-RS set is based at least in part on the QCL RS of the CORESETs configured with the CORESET pool index value with both single TCI states and two TCI states.

8. The method of claim 5, wherein the BFD-RS set is based at least in part on the QCL RS of the CORESETs configured with the CORESET pool index value with two TCI states.

9. The method of claim 5, wherein the BFD-RS set is based at least in part on the QCL RS of the CORESETs configured with the CORESET pool index value with single TCI states or one QCL RS of the CORESETs configured with the CORESET pool index value with two TCI states.

10. The method of claim 5, further comprising:

selecting one QCL RS for the at least one CORESET associated with the two TCI states based at least in part on: a QCL RS of a first TCI state, a QCL RS of a second TCI state, a QCL RS of a TCI with a lowest identifier, a QCL RS of a TCI with a highest identifier, or a QCL RS with a smallest RS periodicity.

11. A method of wireless communication performed by a user equipment (UE), comprising:

transmitting, to a base station associated with multiple transmit-receive points (TRPs), a beam failure recovery (BFR) report based at least in part on a detection of a beam failure event for a TRP;

receiving, from the base station, a response based at least in part on the BFR report;

resetting, based at least in part on a receipt of the response, a set of channels for the TRP associated with the beam failure event;

determining a beam failure detection reference signal (BFD-RS) set based at least in part on active transmission configuration indication (TCI) states for downlink channel receptions in control resource sets (CORESETs), wherein the CORESETs are configured with a CORESET pool index value that exceeds a threshold value, wherein the CORESET pool index value is either 0 or 1, wherein determination of a BFD-RS set is based at least in part on a threshold number of TCI states of CORESETs with the CORESET pool index value; and receiving, from a base station, a BFD-RS based at least in part on the BFD-RS set.

12. The method of claim 11, wherein the set of channels is reset for the TRP associated with the beam failure event using a beam associated with a reported new beam identification reference signal.

13. The method of claim 11, wherein the set of channels includes one or more of a downlink control channel or an uplink control channel.

14. The method of claim 11, wherein the set of channels is reset for the TRP associated with the beam failure event based at least in part on a transmission configuration indicator (TCI) applied to a reported new beam identification reference signal (NBI-RS).

15. The method of claim 14, wherein the TCI applied to the NBI-RS is a joint TCI, and wherein the TCI associated with the NBI-RS is applied for the set of channels including downlink channels and uplink channels.

16. The method of claim 15, wherein the joint TCI is applied to one or more of a channel state information reference signal or a sounding reference signal.

17. The method of claim 14, wherein the TCI applied to the NBI-RS is a downlink TCI, and wherein the TCI associated with the NBI-RS is applied for the set of channels that includes downlink channels.

18. The method of claim 17, wherein the downlink TCI is applied to a channel state information reference signal.

19. The method of claim 14, wherein the TCI applied to the NBI-RS is an uplink TCI, and wherein the TCI associated with the NBI-RS is applied for the set of channels that includes uplink channels.

20. The method of claim 19, wherein the uplink TCI is applied to a sounding reference signal.

21. A user equipment (UE), comprising:

one or more antennas; and a processing system that includes one or more processors and one or more memories that store code for the one or more processors, the processing system configured to cause the UE to:

determine a beam failure detection reference signal (BFD-RS) set based at least in part on active transmission configuration indication (TCI) states for downlink channel receptions in control resource sets (CORESETs), wherein the CORESETs are configured with a CORESET pool index value that exceeds a threshold value, wherein the CORESET pool index value is either 0 or 1, wherein determination of a BFD-RS set is based at least in part on a threshold number of TCI states of CORESETs with the CORESET pool index value; and receive, from a base station, a BFD-RS based at least in part on the BFD-RS set.

22. The UE of claim 21, wherein the CORESETs are associated with search space sets in an order that is based at least in part on a monitoring periodicity.

23. The UE of claim 21, wherein more than one CORESET in the CORESETs is associated with search space sets having a same monitoring periodicity, and wherein an ordering of the more than one CORESET is based at least in part on the CORESET pool index.

24. The UE of claim 21, wherein at least one CORESET of the CORESETs is associated with two TCI states, and wherein the BFD-RS set is based at least in part on a quasi co-location (QCL) reference signal (RS) of the CORESETs configured with the CORESET pool index value.

25. The UE of claim 24, wherein:

the BFD-RS set is based at least in part on the QCL RS of the CORESETs configured with the CORESET pool index value with single TCI states;

the BFD-RS set is based at least in part on the QCL RS of the CORESETs configured with the CORESET pool index value with both single TCI states and two TCI states;

the BFD-RS set is based at least in part on the QCL RS of the CORESETs configured with the CORESET pool index value with two TCI states; or the BFD-RS set is based at least in part on the QCL RS of the CORESETs configured with the CORESET pool index value with single TCI states or one QCL RS of the CORESETs configured with the CORESET pool index value with two TCI states, wherein two QCL RSs are precluded from being selected from a same CORESET.

26. A user equipment (UE), comprising:

one or more antennas; and a processing system that includes one or more processors and one or more memories that store code for the one or more processors, the processing system configured to cause the UE to:

transmit, to a base station associated with multiple transmit-receive points (TRPs), a beam failure recovery (BFR) report based at least in part on a detection of a beam failure event for a TRP;

receive, from the base station, a response based at least in part on the BFR report;

reset, based at least in part on a receipt of the response, a set of channels for the TRP associated with the beam failure event;

determine a beam failure detection reference signal (BFD-RS) set based at least in part on active transmission configuration indication (TCI) states for downlink channel receptions in control resource sets (CORESETs), wherein the CORESETs are configured with a CORESET pool index value that exceeds a threshold value, wherein the CORESET pool index value is either 0 or 1, wherein determination of a BFD-RS set is based at least in part on a threshold number of TCI states of CORESETs with the CORESET pool index value; and receive, from a base station, a BFD-RS based at least in part on the BFD-RS set receive, from a base station, a BFD-RS based at least in part on the BFD-RS set.

27. The UE of claim 26, wherein:

the set of channels is reset for the TRP associated with the beam failure event using a beam associated with a reported new beam identification reference signal; or the set of channels is reset for the TRP associated with the beam failure event based at least in part on a transmission configuration indicator (TCI) applied to a reported new beam identification reference signal (NBI-RS).

28. The UE of claim 27, wherein the TCI applied to the NBI-RS is a joint TCI, the TCI associated with the NBI-RS is applied for the set of channels including downlink channels and uplink channels, and the joint TCI is applied to one or more of a channel state information reference signal or a sounding reference signal.

29. The UE of claim 27, wherein the TCI applied to the NBI-RS is a downlink TCI, the TCI associated with the NBI-RS is applied for the set of channels that includes downlink channels, and the downlink TCI is applied to a channel state information reference signal.

30. The UE of claim 27, wherein the TCI applied to the NBI-RS is an uplink TCI, the TCI associated with the NBI-RS is applied for the set of channels that includes uplink channels, and the uplink TCI is applied to a sounding reference signal.

* * * * *